US007356248B2

(12) United States Patent
Bae et al.

(10) Patent No.: US 7,356,248 B2
(45) Date of Patent: Apr. 8, 2008

(54) APPARATUS AND METHOD OF REPRODUCING SUBTITLE RECORDED IN DIGITAL VERSATILE DISK PLAYER

(75) Inventors: Chang Seok Bae, Taejon (KR); Jeun Woo Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1188 days.

(21) Appl. No.: 10/316,036

(22) Filed: Dec. 11, 2002

(65) Prior Publication Data

US 2003/0188312 A1 Oct. 2, 2003

(30) Foreign Application Priority Data

Feb. 28, 2002 (KR) .................. 10-2002-0010852

(51) Int. Cl.
*H04N 5/91* (2006.01)
(52) U.S. Cl. .......................................... 386/95; 386/96
(58) Field of Classification Search .................. 386/95, 386/52, 46, 94, 96, 111, 125, 70, 83, 126, 386/68, 69; 707/102, 104.1, 1; 725/55; 369/30.01, 275.3, 47.32, 30.25; 370/389; 715/500.1; 345/589, 619; 398/107
See application file for complete search history.

(56) References Cited

U.S. PATENT DOCUMENTS

| 6,292,283 B1 * | 9/2001 | Grandbois ................ 398/107 |
| 6,345,147 B1 | 2/2002 | Mimura et al. |
| 6,345,417 B2 * | 2/2002 | Leder et al. .................. 19/150 |
| 6,381,398 B1 * | 4/2002 | Yamauchi et al. ............ 386/52 |
| 6,389,224 B2 * | 5/2002 | Mori et al. .................. 386/111 |
| 6,424,792 B1 * | 7/2002 | Tsukagoshi et al. .......... 386/95 |
| 6,429,879 B1 | 8/2002 | Sturgeon et al. |
| 6,567,371 B1 * | 5/2003 | Otomo et al. ............. 369/275.3 |
| 6,573,819 B1 * | 6/2003 | Oshima et al. ............. 386/111 |
| 6,658,160 B1 * | 12/2003 | Winter et al. ............... 382/245 |
| 6,856,756 B1 * | 2/2005 | Mochizuki et al. ........... 386/68 |
| 6,901,207 B1 * | 5/2005 | Watkins ....................... 386/83 |
| 6,944,621 B1 * | 9/2005 | Collart ....................... 707/102 |
| 6,970,368 B1 * | 11/2005 | Bautista et al. ............... 365/49 |
| 7,000,152 B1 * | 2/2006 | Lin ............................. 714/42 |
| 7,095,704 B2 * | 8/2006 | Otomo et al. ............. 369/275.3 |
| 7,136,579 B2 * | 11/2006 | Kim .......................... 386/125 |
| 7,292,507 B2 * | 11/2007 | Han ......................... 369/30.25 |
| 2001/0052127 A1 * | 12/2001 | Seo et al. ..................... 725/55 |
| 2002/0092021 A1 * | 7/2002 | Yap et al. ..................... 725/55 |
| 2002/0184180 A1 * | 12/2002 | Debique et al. ............... 707/1 |
| 2003/0039472 A1 * | 2/2003 | Kim .......................... 386/126 |
| 2003/0052897 A1 * | 3/2003 | Lin ............................. 345/619 |
| 2003/0068158 A1 * | 4/2003 | Kudou ........................ 386/95 |
| 2003/0126607 A1 * | 7/2003 | Phillips et al. ................ 725/55 |

(Continued)

*Primary Examiner*—Bipin Shalwala
*Assistant Examiner*—Prabodh Dharia
(74) *Attorney, Agent, or Firm*—Lowe Hauptman Ham & Berner LLP

(57) ABSTRACT

In an apparatus and method of reproducing a subtitle recorded in a digital versatile disk player including a subtitle processing section for receiving, storing and reproducing multilingual subtitles, as well as video data and audio data of multiple titles which are recorded at initially manufacturing an optical disc, in which users can watch a movie in their specified language, the apparatus of reproducing a subtitle used in a DVD player includes a subtitle information processing section for receiving and storing a subtitle of a language wanted by a user, and reproducing the subtitle information of the language wanted by the user on a screen.

15 Claims, 4 Drawing Sheets

U.S. PATENT DOCUMENTS

| | | |
|---|---|---|
| 2003/0152370 A1* | 8/2003 | Otomo et al. .................. 386/98 |
| 2003/0194211 A1* | 10/2003 | Abecassis .................... 386/69 |
| 2003/0231857 A1* | 12/2003 | Green ......................... 386/46 |
| 2005/0091283 A1* | 4/2005 | Debique et al. ......... 707/104.1 |
| 2005/0216919 A1* | 9/2005 | Hull et al. .................. 719/322 |
| 2006/0133777 A1* | 6/2006 | Yamamoto et al. ........... 386/96 |
| 2006/0155398 A1* | 7/2006 | Hoffberg et al. .............. 700/86 |
| 2006/0181965 A1* | 8/2006 | Collart .................... 369/30.01 |
| 2007/0053513 A1* | 3/2007 | Hoffberg .................... 380/201 |

* cited by examiner

APPARATUS AND METHOD OF REPRODUCING SUBTITLE RECORDED IN DIGITAL VERSATILE DISK PLAYER

BACKGROUND OF THE INVENTION

1. Field of the Invention

The present invention relates to a digital versatile disk player, and more particularly, to an apparatus and method of reproducing a subtitle recorded in a digital versatile disk player including a subtitle processing section for receiving, storing and reproducing multilingual subtitles, as well as video data and audio data of multiple titles which are recorded at initially manufacturing an optical disc, in which users can watch a movie in their specified language.

2. Background of the Prior Art

A home theater system constructed a high definition TV, DVD player capable of reproducing a multifunction disc, and a 5.1 channel audio system has been generalized. Generally spread DVD titles are for the most part movie titles. The movie DVD title basically includes high definition video data, audio information for one or more specific language, and subtitle information supporting one or more language. Also, the movie DVD title includes a trailer of a movie, a production process, interviews with a director and players, and additional contents, as well as the main title for the movie. These contents are a major factor in that DVD users enjoy DVD titles, as well as providing users with the pleasure of watching the movie. In recent years, according to the powerful demand of DVD users, DVD manufactures are considering whether the subtitle is recorded in the additional contents for DVD titles to be put on the market, but the additional contents do not include the subtitle in most of titles.

Meanwhile, according to Korean Patent No. 1999-00227901999-0022790 entitled "Music accompanying apparatus having digital multifunction disk and method of operating the same", which is hereby incorporated by reference, MIDI accompanying data, words subtitle data, scene image data and chorus data, which are corresponding to old music of high capacity, are stored in the digital versatile disk which is a data storing medium of high capacity, while MIDI accompanying data, words subtitle data, scene image data and chorus data, which are corresponding to new music of low capacity, are stored in a flash memory. In this manner, depending upon the kind of music, i.e., the old music or new music, which is selected by the user, the apparatus performs the accompanying operation by reading the corresponding data from the respective memories. The memory capacity of the music accompanying apparatus is gradually increased with the passage of time. The above-mentioned patent may easily overcome the limit of memory capacity of the music accompanying apparatus by employing the digital versatile disk. In addition, a new musical composition may be easily added into the flash memory from a new music pack removably inserted in a receiving opening formed at a desired portion of the music accompanying apparatus or from a server through a local area network or a public network. Therefore, whenever the new musical composition is added, there is no required for replacing the digital versatile disk, thereby adding the new musical composition for almost nothing.

Also, a method of changing a primary language and a DVD system using the same are disclosed by Korean Patent Appl. No. 1999-0209898 entitled "Method of changing primary language and digital versatile disk system", which is hereby incorporated by reference. In the application, user can select and change the primary language from a menu, when the preset primary language is reproduced before the time the user selects 8 languages and 32 subtitles provided by the DVD. If the user selects the primary language from the menu, a system controller displays the language selected and changed through an OSD function. If the user selects one language in view of the contents displayed on the screen, the system controller alters and sets the selected language as the primary language, in stead of the preset primary language. In addition, the system controller displays a note indicative of that the primary language is changed to the user. Therefore, since the application may change the primary language as a mother tongue, in case of using the DVD title manufactured in other country, it is not necessary for the user to select the reproducing language of the DVD title.

FIG. 1 is a block diagram of a conventional DVD player.

The conventional DVD player includes a DVD reproducing section 10 for driving a DVD title, an A/V signal detecting and separating section 12 for reading audio and video signals stored in the DVD title and separating the audio signal and the video signal from the detected A/V signal, an audio signal decoding section 14 for decoding the separated audio stream to output it to a loudspeaker 18, and a video signal decoding section 16 for decoding the separated video stream to output it on a screen of a display 20.

The conventional DVD player produces only the subtitle information recorded when manufacturing it, and thus may not reproduce the subtitle information on the additional contents in the wanted language.

As described above, users may not fully enjoy various contents provided by the DVD title by use of the conventional DVD player, because of unfamiliar with foreign language contained in the DVD titles manufactured in the foreign countries. In addition, it is difficult for the conventional DVD player to enjoy the DVD title in other languages instead of the limited number of the languages provided by the corresponding DVD title.

Specifically, when users watch the DVD title through a TV, the DVD player may not reproduce other subtitle, except the subtitle basically provided by the DVD title.

SUMMARY OF THE INVENTION

Accordingly, the present invention is directed to an apparatus and method of reproducing a subtitle recorded in a digital versatile disk player that substantially obviate one or more problems due to limitations and disadvantages of the related art.

An object of the present invention is to provide an apparatus and method of reproducing a subtitle recorded in a digital versatile disk player including a subtitle processing section for receiving, storing and reproducing multilingual subtitles, as well as video data and audio data of multiple titles which are recorded at initially manufacturing an optical disc, in which users can watch a movie in their specified language. In this manner, after a subtitle information storing section receives and stores the subtitle information wanted by users, the users select the subtitle information stored while watching the DVD title, so that the stored subtitle is reproduced on a screen of TV, synchronous with the reproduction of the moving picture. The users unfamiliar with foreign language may fully enjoy various contents provided by the DVD title. In addition, the DVD manufactures may provide users with the subtitle information, which is not contained in the DVD title when manufacturing it, via Internet.

To achieve the object and other advantages, according to one aspect of the present invention, there is provided a method of reproducing subtitle information in a DVD player, the method comprising the steps of: displaying a set menu of the subtitle information; selecting the subtitle information of a language wanted by a user; if the subtitle information of the language wanted is not provided by the DVD title itself, receiving the subtitle information of the language wanted from a subtitle information storing section in the DVD player; selecting the subtitle information of the language wanted among the subtitle information received by the subtitle information storing section; and reproducing a picture and the subtitle information of the language selected by the user.

The step of receiving the subtitle information comprises the steps of: receiving the subtitle information from the subtitle information receiving section by use of a floppy disk, and storing the subtitle information in the subtitle information storing section; receiving the subtitle information by connecting the subtitle information receiving with a network such as Internet, and storing the subtitle information in the subtitle information storing section; and receiving the subtitle information from the subtitle information receiving section via a terminal such as a PDA, and storing the subtitle information in the subtitle information storing section.

The step of reproducing the picture and the subtitle information comprises the steps of: when operation of the DVD player starts, receiving an operation timing signal from an A/V signal detecting and extracting section respectively extracting an audio signal and a video signal from the received signal; and reproducing the subtitle information corresponding to the operation timing signal of the audio signal through the subtitle information reproducing section to synchronize the subtitle information with the picture.

The subtitle information includes subtitle head information having a title of the DVD title, a subtitle language, a font name for reproducing the subtitle, a font size, a font color and so forth, and a subtitle text information having actual subtitles having a frame number of the picture to be displayed and lines information when the picture corresponding to the frame number is displayed.

According to another aspect of the present invention, there is provided an apparatus of reproducing a subtitle used in a DVD player including a DVD reproducing section for driving a DVD title, an A/V signal detecting and separating section for reading audio and video signals stored in the DVD title and separating the audio signal and the video signal from the detected A/V signal, an audio signal decoding section for decoding the separated audio stream to output it to a loudspeaker, and a video signal decoding section for decoding the separated video stream to output it on a screen of a display, the apparatus comprising: a subtitle information processing section for receiving and storing a subtitle of a language wanted by a user, and reproducing the subtitle information of the language wanted by the user on a screen.

The subtitle information processing section includes a subtitle information receiving section for receiving the subtitle information of the language wanted by the user, in addition to the subtitle information of a language provided the DVD title; a subtitle information storing section for storing the subtitle information inputted from the subtitle information receiving section; and a subtitle information reproducing section for reproducing the subtitle information stored in the subtitle information storing section.

The subtitle information receiving section includes a floppy disk capable of receiving the subtitle information of the language wanted by the user, in addition to the subtitle information of a language provided the DVD title; a network connecting section for receiving the subtitle information from a subtitle information providing server via Internet or receiving the subtitle information from a computer of the user; and an infrared ray receiving section for receiving the subtitle information from a portable information terminal such as PDA.

The subtitle information storing section includes a floppy disk, a hard disk, a flash memory and so forth to store and provide the subtitle information. The subtitle information reproducing section includes a video mixing section for erasing the subtitle information stored in the DVD title to synchronize the subtitle information selected by the user with the picture during operation of the DVD player, and superposing or mixing the subtitle information with a video signal inputted from the video signal decoding section.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention will now be explained with reference to the accompanying drawings.

Figure 1:
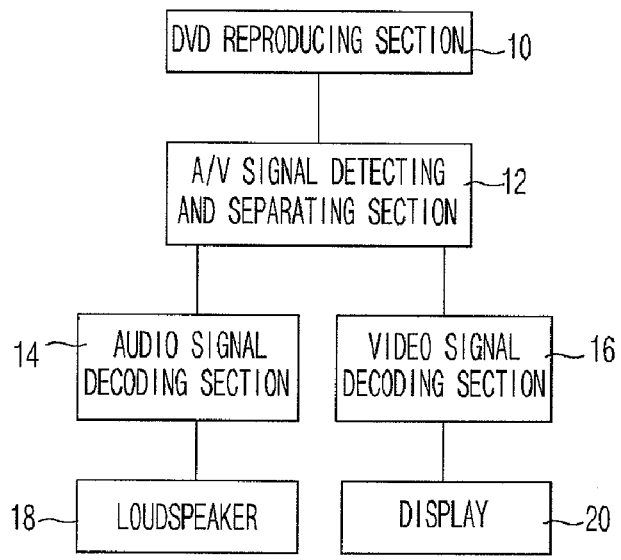
FIG. 1 is a block diagram of a conventional DVD player.
Figure 2:
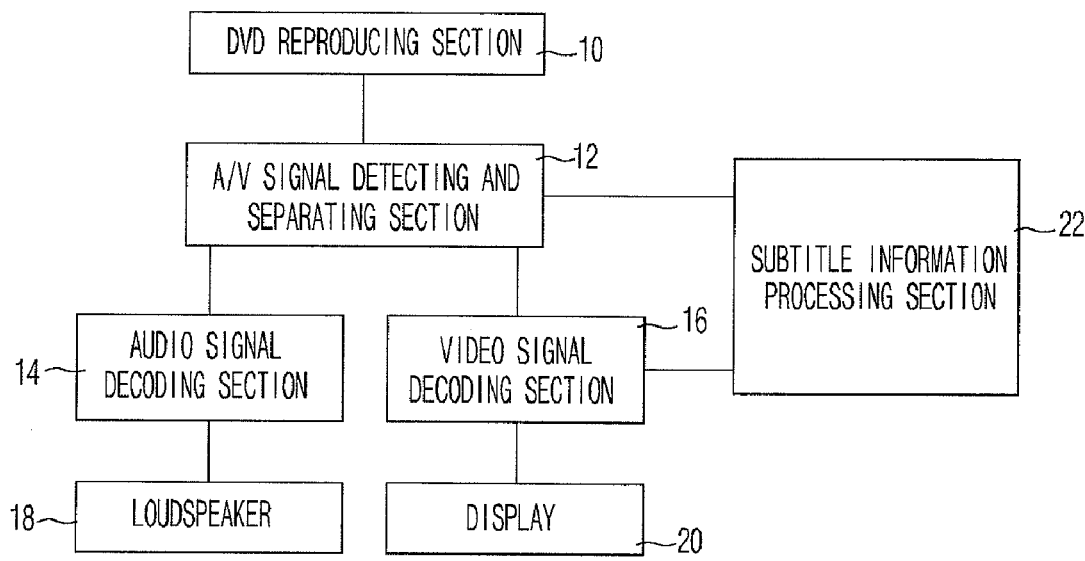
FIG. 2 is a block diagram of a DVD player capable of reproducing multilingual subtitle information through a subtitle processing section according to the present invention.

FIG. 2 is a block diagram of a DVD player capable of reproducing multilingual subtitle information through a subtitle processing section according to the present invention.

The general DVD player includes a DVD reproducing section 10 for driving a DVD title, an A/V signal detecting and separating section 12 for reading audio and video signals stored in the DVD title and separating the audio signal and the video signal from the detected A/V signal, an audio signal decoding section 14 for decoding the separated audio stream to output it to a loudspeaker 18, and a video signal decoding section 16 for decoding the separated video stream to output it on a screen of a display 20. As shown in FIG. 2, the DVD player further includes a subtitle information processing section 22 for receiving, storing and reproducing a subtitle of a language wanted by a user. Therefore, the DVD title receives and stores the added subtitle information made of other language, in addition to the subtitle recorded at initially manufacturing the optical disc, so that the user can watch the added subtitle.

Figure 3:
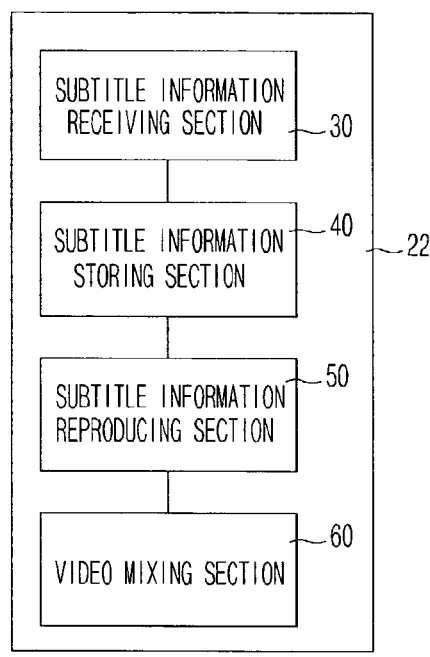
FIG. 3 is a block diagram of a detailed configuration of a subtitle information processing section.

FIG. 3 is a block diagram of a detailed configuration of the subtitle information processing section 22.

The subtitle information processing section 22 includes a subtitle information receiving section 30, a subtitle information storing section 40 for storing the subtitle information, a subtitle information reproducing section 50 for reproducing the stored subtitle information, and a video mixing section 60 for mixing the reproduced subtitle information with the decoded video signal to display the subtitle information and a picture.

The video mixing section 60 is to obtain one output from two or more video signals. In case of a moving picture, the video mixing section 60 superposes or mixes two or more video signals.

In this manner, the video mixing section 60 processes the picture and subtitle. The subtitle is made in a type of image data, and is used as bit map files or Tiff files, but may be used as stream format.

The subtitle information reproducing section 50 receives a timing signal from the A/V signal detecting and extracting section 12, and synchronizes the reproduced subtitle information with the picture outputted to a display 20 and an audio outputted to the loudspeaker 18.

Figure 4:
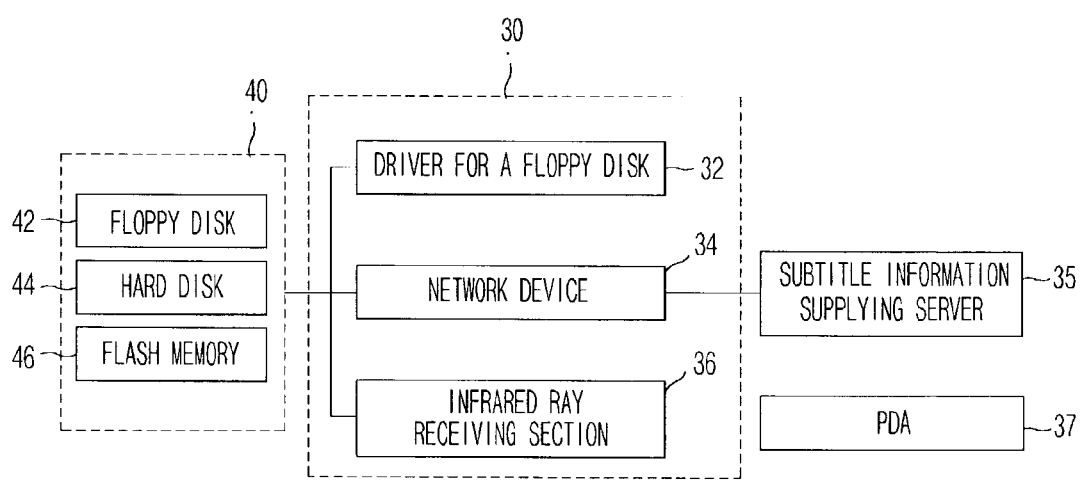
FIG. 4 is a block diagram of detailed configuration of a subtitle information receiving section and a subtitle information storing section.

FIG. 4 is a block diagram of detailed configuration of the subtitle information receiving section 30 and the subtitle information storing section 40.

The subtitle information receiving section 30 is to receive the subtitle information through a driver for a floppy disk 32 which inputs the subtitle of wanted language and contents to the DVD player from the exterior, and a network device 34 such as Ethernet, and to receive the subtitle information from a radio communication device such as an infrared ray receiving section 36.

The subtitle information receiving section 30 may receive the subtitle information through the floppy disk 32, and stores it to the subtitle information storing section 40 of DVD player. In case of using the network device 34, the subtitle information receiving section 30 may receive the subtitle information through a subtitle information supplying server 35 providing the subtitle information via the online. The subtitle information supplying server 35 may be managed by a DVD title manufacturer so as to provide users with the subtitle information which is not contained when manufacturing the DVD title. The infrared ray receiving section 36 wirelessly receives the subtitle information through a portable information terminal such as PDA 37, and stores the information in the subtitle information storing section 40 such as a hard disk 44 and a flash memory 46. The subtitle information storing section 40 mounted in the DVD player for storing the subtitle information includes a driver for a floppy disk 42, a driver for the hard disk 44, and the flash memory 46. With the DVD player of the present invention, the subtitle information storing section 40 may be provided with any one or more of the above-mentioned storing devices.

Figure 5:
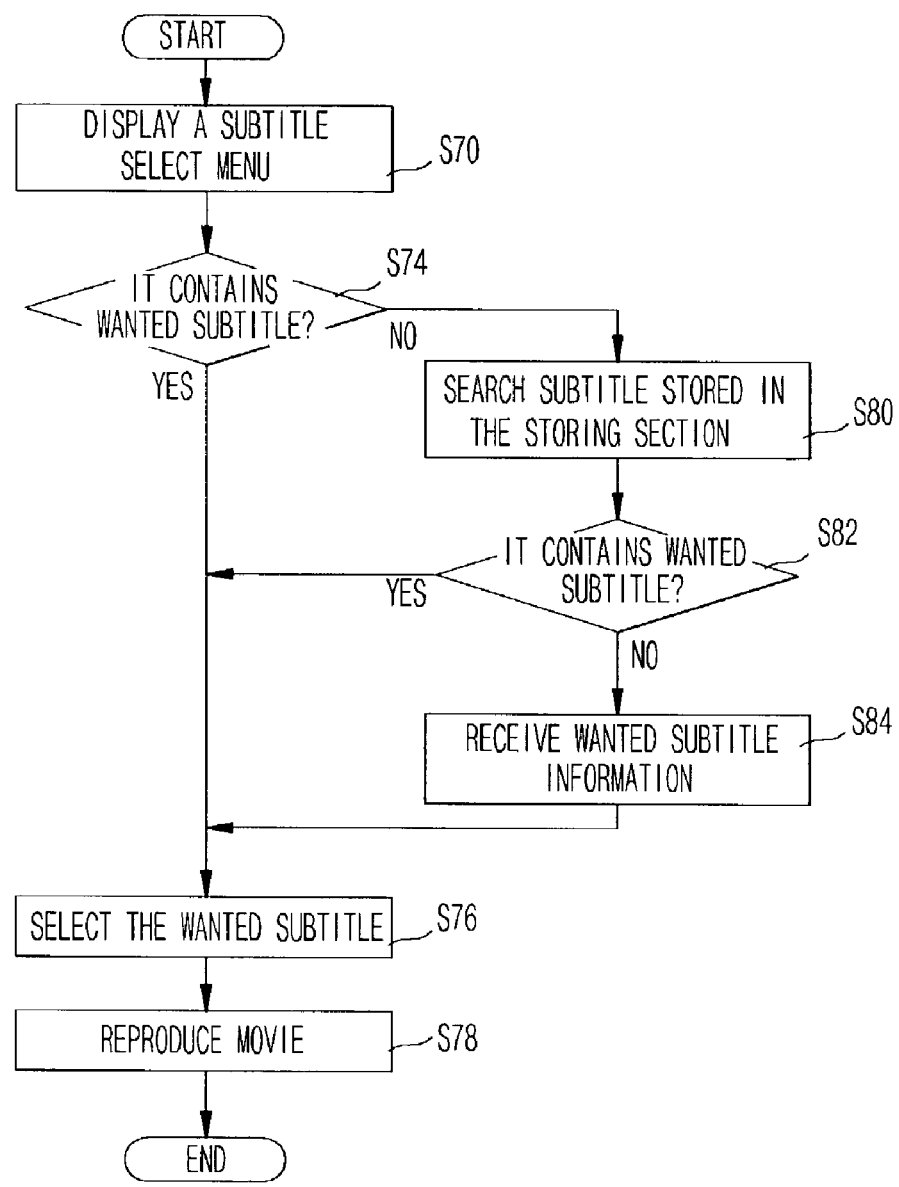
FIG. 5 is a flowchart illustrating the operation of the DVD player of the present invention.

FIG. 5 is a flowchart illustrating the operation of the DVD player of the present invention.

If a menu is displayed to select the subtitle information, the user identifies whether the wanted subtitle information is contained in the menu (steps S70 and S74).

If the subtitle information of the language wanted by the user is provided, the user selects the corresponding subtitle information to reproduce the DVD title (steps S76 and S78).

Meanwhile, if the wanted subtitle information is not provided, the user identifies the subtitle information by searching it stored in the subtitle information storing section 40 (step S80).

If the subtitle information storing section 40 contains the wanted subtitle information, the user selects the corresponding subtitle information to reproduce the DVD title (step S82).

Meanwhile, if the wanted subtitle information is not provided in the subtitle information storing section 40, the subtitle information is received from the subtitle information receiving section 30 through the floppy disk 32, the network device 34, the infrared ray receiving section 36 and so forth (step S84).

If the subtitle information received from the subtitle information receiving section 30 is stored in the subtitle information storing section 40, the user selects the corresponding subtitle information to reproduce the DVD title (steps S76 and S78).

Figure 6:
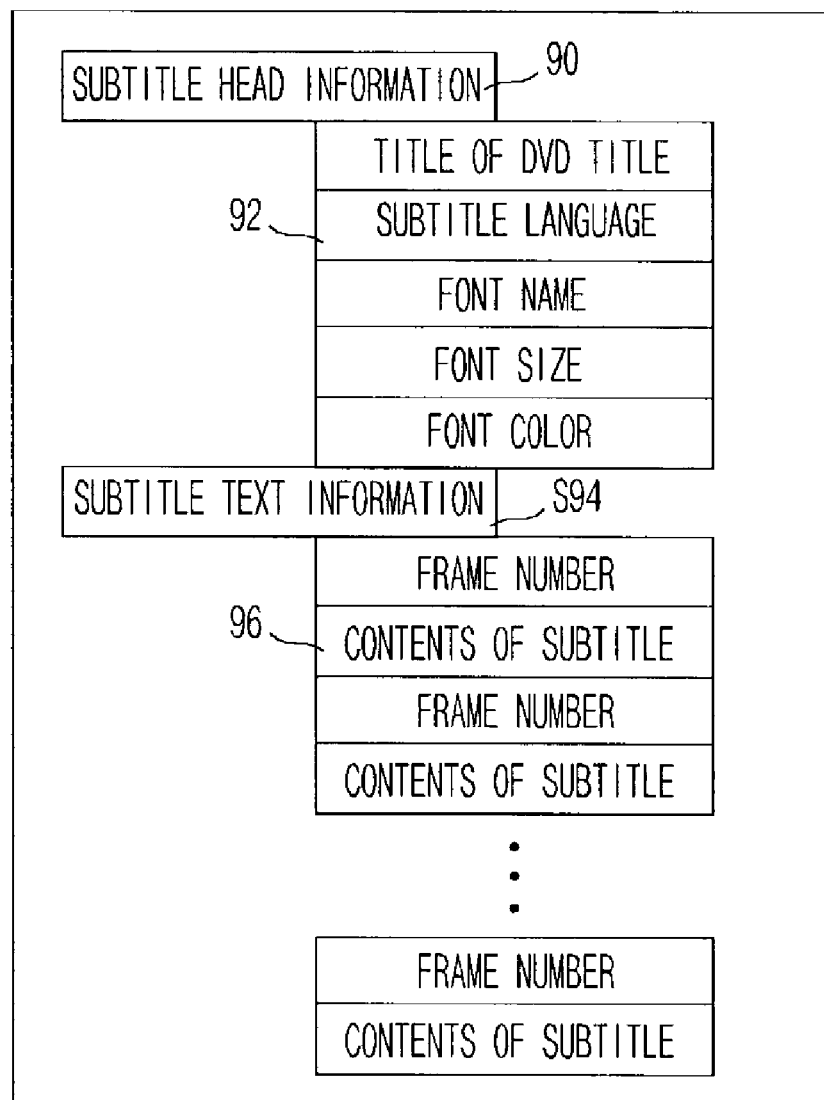
FIG. 6 is a view illustrating the configuration of subtitle information of the present invention.

FIG. 6 is a view illustrating a configuration of the subtitle information of the present invention.

The subtitle information mainly constitutes subtitle head information 90 consisting of basic information on the subtitle, and subtitle text information 94 consisting of actual subtitles. The subtitle head information 90 includes properties indicated by a reference numeral 92 such as a title of the DVD title, a subtitle language, a font name for reproducing the subtitle, a font size, a font color and so forth.

The subtitle text information 94 is stored with frame numbers 96 of the picture to be reproduced and contents 96 of the subtitle. At that time, the frame number 96 is used when the subtitle is reproduced together with the picture, synchronous with a timing signal transmitted from the A/V signal detecting and extracting section 12 to the subtitle information section 22, as shown in FIG. 2.

As described above, the DVD player of the present invention has the subtitle information processing section 22, which receives the subtitle information regarding the additional contents such as a production process of the movie, interviews with a director and leading players, and so forth, when the additional contents being known as a major feature of the DVD do not support the subtitle that the user wanted to display. Therefore, the user may enjoy the DVD title by use of the subtitle information of wanted language.

With the above description of the present invention, the subtitle information processing apparatus is installed in the conventional DVD player, so that the user may watch the DVD title by use of not only the subtitle information basically provided by the DVD title, but also the subtitle of language which the user receives and selects the subtitle information. Therefore, the present invention settles the dissatisfaction of users, due to that the additional contents of the DVD titles are not supported by the wanted language. In addition, the users may enjoy various contents provided the DVD title. Furthermore, since the DVD player is provided with the cable network device or the infrared ray communication device, it is able to deal with the digital information appliance. Specifically, the present invention may be employed to watch the high definition video by installing the high-speed network device and the high-capacity storage device and receiving the on-demand video service via Internet.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of reproducing a subtitle by a DVD player, the method comprising the steps of:
   displaying a set menu of subtitles of various languages available on a DVD being played by the DVD player;
   if a subtitle of a language wanted by a user is not provided on the DVD, allowing the user to search subtitle information received in a subtitle information storing section of the DVD player for the subtitle of the wanted language;
   upon the user selecting the subtitle information corresponding to the subtitle of the wanted language among the subtitle information received by the subtitle information storing section, playing a title of the DVD while reproducing the subtitle of the wanted language from the selected subtitle information.

2. The method as claimed in claim 1, further comprising at least one of the steps of:
   receiving the subtitle information, separately from the corresponding title to be played, from a floppy disk readable by a subtitle information receiving section of the DVD player, and storing the received subtitle information in the subtitle information storing section;
   receiving the subtitle information, separately from the corresponding title to be played, from a network connected to a subtitle information receiving section of the DVD player, and storing the received subtitle information in the subtitle information storing section; and
   receiving the subtitle information, separately from the corresponding title to be played, from a PDA wirelessly connected with a subtitle information receiving section of the DVD player, and storing the received subtitle information in the subtitle information storing section.

3. The method as claimed in claim 1, wherein the step of reproducing the subtitle comprises the steps of:
   receiving an operation timing signal from an A/V signal detecting and extracting section of the DVD player respectively extracting an audio signal and a video signal from an A/V signal received while playing the title of the DVD; and
   reproducing the subtitle corresponding to the operation timing signal of the audio signal through a subtitle information reproducing section to synchronize the subtitle with pictures in the video signal.

4. The method as claimed in claim 1, wherein the subtitle information includes
   subtitle head information having a title of the DVD title, a subtitle language, a font name for reproducing the subtitle, a font size, a font color, and
   a subtitle text information having numbers of various frames of the DVD title to be played and subtitle contents associated with said frames.

5. An apparatus for reproducing a subtitle in a DVD player including a DVD reproducing section for driving a DVD title, an A/V signal detecting and separating section for reading and separating audio and video signals stored in the DVD title, an audio signal decoding section for decoding the separated audio signal into an audio stream playable by a loudspeaker, and a video signal decoding section for decoding the separated video signal into a video stream displayable on a screen, the apparatus comprising:
   a subtitle information processing section for receiving and storing a subtitle of a language which is wanted by a user but not available on a DVD being played by the DVD player and for reproducing the subtitle of the wanted language on the screen while the DVD player is playing a corresponding title of the DVD.

6. The apparatus as claimed in claim 5, wherein the subtitle information processing section includes
   a subtitle information receiving section for receiving the subtitle of the wanted language, in addition to subtitles of other languages already provided on the DVD;
   a subtitle information storing section for storing the subtitle inputted from the subtitle information receiving section; and
   a subtitle information reproducing section for reproducing the subtitle stored in the subtitle information storing section.

7. The apparatus as claimed in claim 6, wherein the subtitle information receiving section includes at least one of:
   a floppy disk reading section for reading the subtitle of the wanted language, separately from the corresponding title to be played, from a floppy disk;
   a network connecting section for receiving the subtitle, separately from the corresponding title to be played, from a subtitle information providing server via the Internet or from a computer of the user; and
   an infrared ray receiving section for receiving the subtitle, separately from the corresponding title to be played, wirelessly from a portable information terminal.

8. The apparatus as claimed in claim 6, wherein the subtitle information storing section includes at least one of a floppy disk, a hard disk, a flash memory to store and provide the subtitle.

9. The apparatus as claimed in claim 6, wherein the subtitle information reproducing section includes a video mixing section for erasing the subtitle information stored in the DVD title to synchronize the subtitle selected by the user with pictures of the DVD title being played by the DVD player, and for superposing or mixing the subtitle selected by the user with the pictures contained in a video signal inputted from the video signal decoding section.

10. A method of reproducing a subtitle by a DVD player, the method comprising the steps of:
    displaying a set menu of subtitles of various languages available on a DVD being played by the DVD player;
    if a subtitle of a language wanted by a user is not provided on the DVD, allowing the user to search subtitle information stored in a subtitle information storing section of the DVD player for the subtitle of the wanted language;
    if the subtitle of the wanted language is not currently stored in the subtitle information storing section,
      receiving the subtitle of the wanted language from an external source other than the DVD and components of the DVD player via a subtitle information receiving section of the DVD player, and
      storing the received subtitle of the wanted language in the subtitle information storing section;
    upon the user selecting the subtitle information corresponding to the subtitle of the wanted language among the subtitle information stored in or received by the subtitle information storing section, playing a title of the DVD while reproducing the subtitle of the wanted language from the selected subtitle information.

11. The method as claimed in claim 10, wherein
    the external source is a floppy disk and the subtitle information receiving section is a floppy disk reader, and
    the receiving step comprises the floppy disk reader accessing the floppy disk to obtain the subtitle of the wanted language.

12. The method as claimed in claim 10, wherein
the external source is a remote computer connected via a network to the subtitle information receiving section which is a network connecting section, and
the receiving step comprises the network connecting section accessing the remote computer to obtain the subtitle of the wanted language.

13. The method as claimed in claim 12, wherein the network is the Internet and the remote computer is a server connected to the internet and containing subtitle information not included in the DVD when manufacturing the DVD.

14. The method as claimed in claim 10, wherein
the external source is a PDA wirelessly connected to the subtitle information receiving section which is an infrared ray receiving section, and
the receiving step comprises the infrared ray receiving section wirelessly accessing the PDA to obtain the subtitle of the wanted language.

15. The method as claimed in claim 10, wherein the reproducing step comprises:
erasing the subtitle information stored in the DVD title,
synchronizing the subtitle of the wanted language with pictures of the DVD title being played by the DVD player, and
superposing or mixing the subtitle of the wanted language with the pictures on a screen.

* * * * *